Dec. 2, 1969   A. G. STEINMAYER   3,482,108
UNDERGROUND DISTRIBUTION TRANSFORMER
Filed April 6, 1967

Inventor.
Alwin G. Steinmayer
By Charles A. Gunkell
Attorney

Dec. 2, 1969  A. G. STEINMAYER  3,482,108
UNDERGROUND DISTRIBUTION TRANSFORMER
Filed April 6, 1967  3 Sheets-Sheet 2
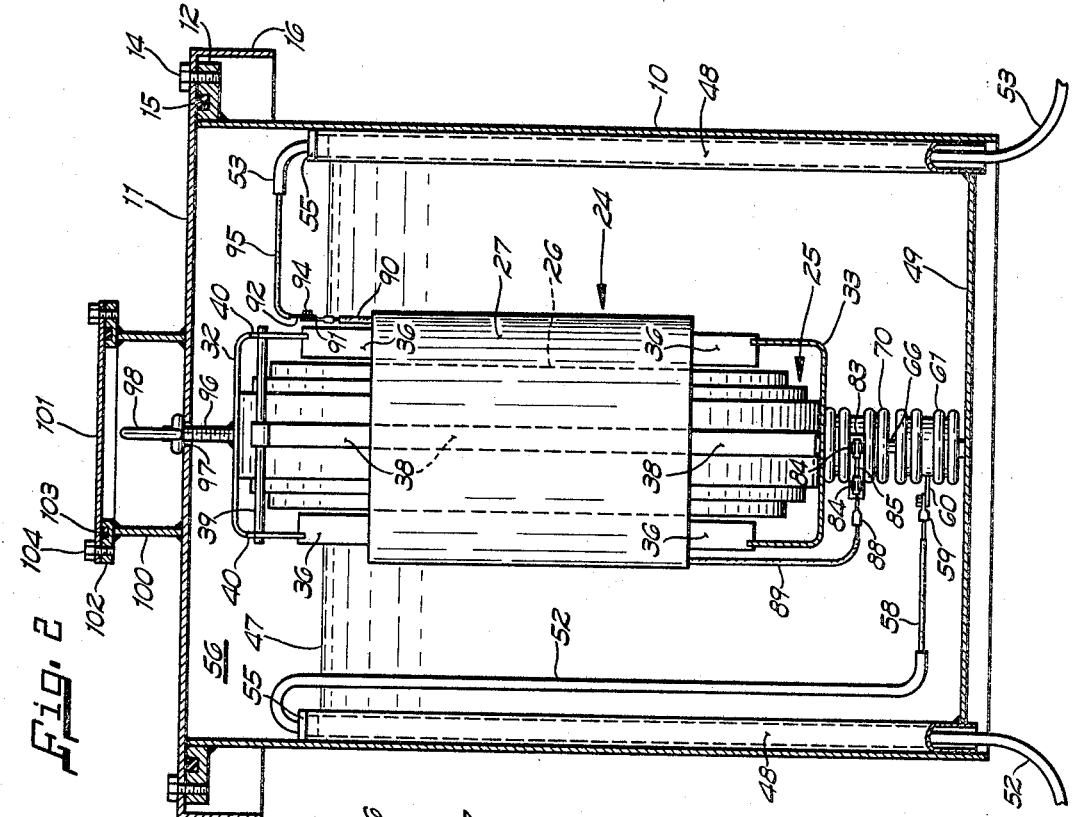
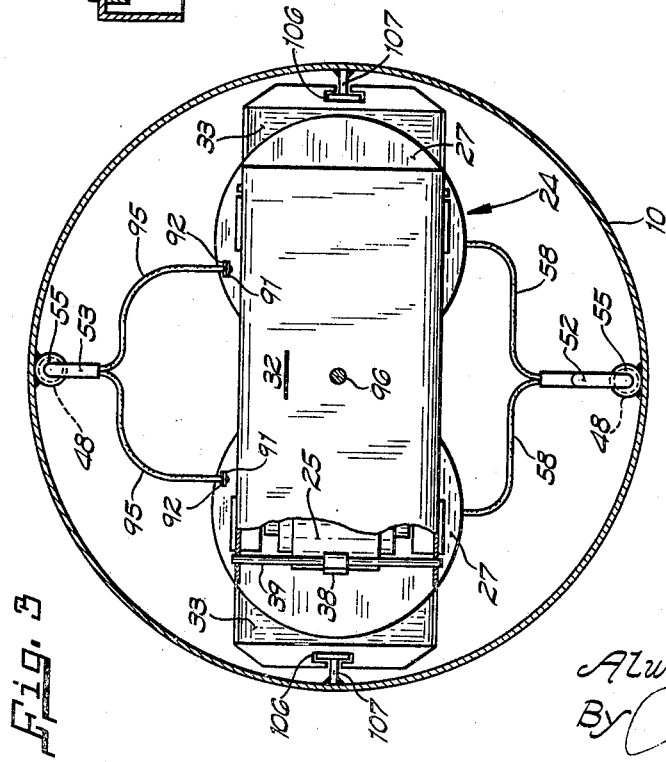
Inventor.
Alwin G. Steinmayer
By
Attorney Dec. 2, 1969 A. G. STEINMAYER 3,482,108
UNDERGROUND DISTRIBUTION TRANSFORMER
Filed April 6, 1967 3 Sheets-Sheet 3

Inventor.
Alwin G. Steinmayer
By
Attorney

United States Patent Office 3,482,108
Patented Dec. 2, 1969

3,482,108
UNDERGROUND DISTRIBUTION
TRANSFORMER
Alwin G. Steinmayer, Milwaukee, Wis., assignor to Mc-Graw-Edison Company, Milwaukee, Wis., a corporation of Delaware
Filed Apr. 6, 1967, Ser. No. 628,980
Int. Cl. H02j 3/00; H01f 27/02
U.S. Cl. 307—17                               6 Claims

ABSTRACT OF THE DISCLOSURE

An underground, direct burial, transformer enclosure having the incoming cables entering the enclosure through conduit incorporated into the enclosure and utilizing the cable insulation to insulate the cable conductor from the enclosure wall. The primary cables are connected to stationary contacts engaging movable contacts mounted on the transformer support structure. The transformer support structure is movably mounted and is connected through the enclosure cover to an exterior operator for moving the transformer and thus the movable contacts into and out of engagement with the stationary contacts. In this manner the transformer may be connected or disconnected from the primary cables.

BACKGROUND OF THE INVENTION

This invention relates to underground electrical distribution systems and, in particular, to electrical transformers for underground distribution systems.

Overhead electrical distribution systems are aesthetically displeasing and detract from the beauty of residential areas. In an attempt to improve the aesthetic appearance of distribution systems, electric utilities have installed buried cable with distribution transformers enclosed in metallic housings supported on concrete pads at ground level. An underground distribution system minimizes the problem of wind, ice, and tree-limb damage and reduces the likelihood of lightning damage, but the high cost of underground system in comparison to overhead has discouraged more widespread adoption of underground distribution systems for residential service. The metallic housings for distribution transformers supported on concrete pads at ground level are expensive and time-consuming to construct, particularly in that they require forms for the concrete pad and inherently involve delay while the poured concrete sets. Further, such metallic casings detract from the appearance of the residential area and are a potential source of danger. Utilities have also installed electrical transformers below ground level, but such underground transformers are normally installed in vaults which are expensive to construct and prevent dissipation of the transformer heat losses to the earth.

SUMMARY OF THE INVENTION

It is an object of the invention to provide an electrical transformer for an underground distribution system which can be directly buried in the ground, thereby simplifying and reducing the cost of the underground distribution system and eliminating the aesthetically displeasing components thereof. It is a further object to provide such an underground distribution transformer which need not be installed in a separate vault and wherein the transformer heat losses may be conducted directly to the earth through the wall of the casing. Another object is to provide such an underground transformer having novel bell means to prevent water from entering the casing and from reaching the sealing gaskets.

It is a still fudther object of the invention to provide such an underground distribution transformer having novel means accessible above ground to de-energize the transformer windings.

Another object is to provide such a direct burial distribution transformer wherein the core and coil assembly can easily be removed from service for inspection or repair or to permit changing of a fuse or installation of a different kva size unit without disturbing the casing or the underground cable to the transformer.

Still another object of the invention is to provide such a direct burial distribution transformer which does not require a separate vault and eliminates the necessity of primary and secondary insulating bushings by utilizing the insulation of the underground cables to prevent flashover between the electrical leads and the transformer casing.

These and other objects and advantages of the invention will be more readily apparent from the following detailed description when taken in conjunction with the accompanying drawing wherein:

DESCRIPTION OF THE DRAWINGS

FIGS. 1 and 2 are vertical sectional views at right angles to each other through a preferring embodiment of the inventoin showing the core and coil assembly in full lines;

FIG. 3 is a view taken on line 3—3 of FIG. 1;

DESCRIPTION OF THE PREFERRED EMBODIMENT

Figure 1:
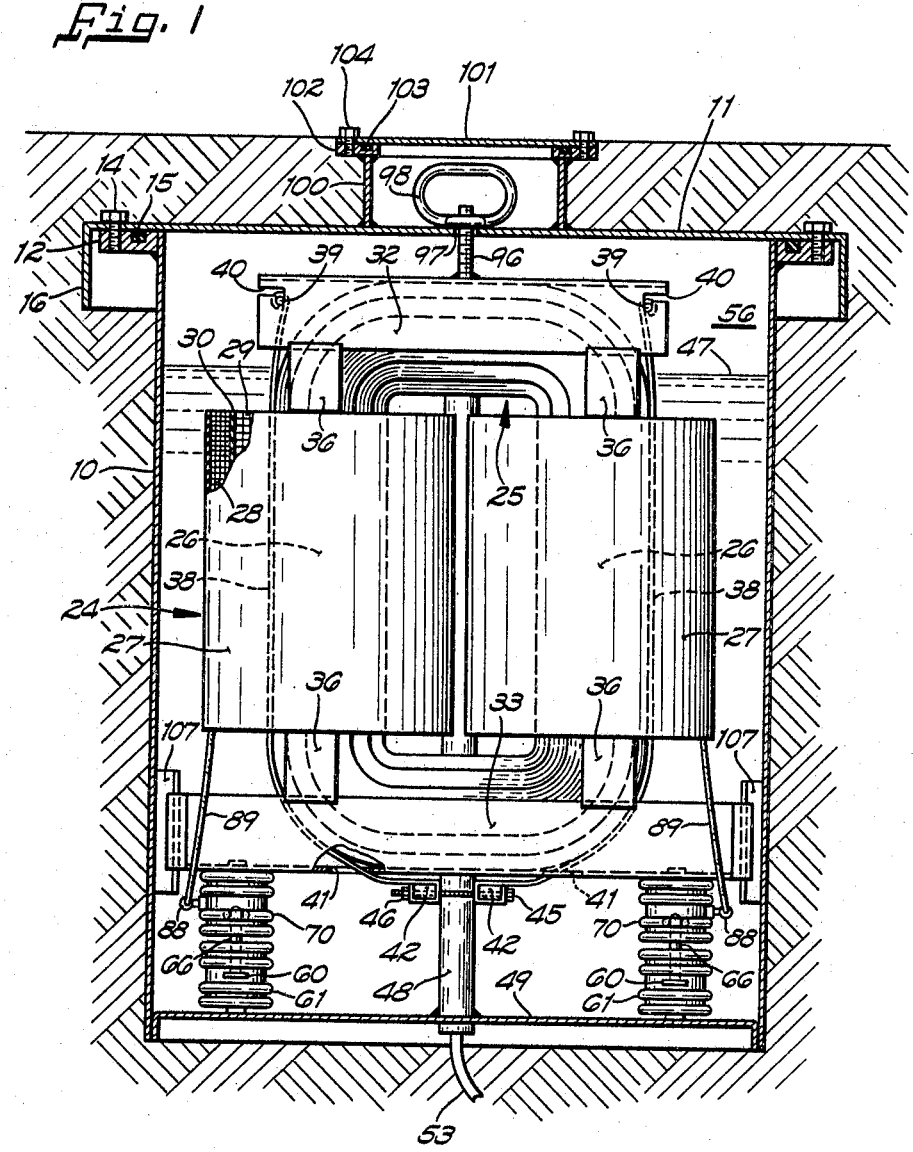

Referring to the drawing, the distribution transformer of the invention includes a cylindrical metallic tank 10, preferably of $3/16$ inch thick steel, coated with a suitable corrosion resistant bitumastic such as tar pitch compound and buried in the earth with its upper end approximately at ground level. A cover 11 seals the open upper end of tank 10. A metallic ring 12 welded adjacent the upper edge of tank 10 has circumferentially spaced apart tapped holes which engage bolts 14 extending through cover 11 and an annular groove in which an annular gasket 15 of suitable resilient material such as rubber is compressed by cover 11 to seal the upper end of tank 10. Cover 11 extends an appreciable distance radially beyond the sidewall of casing 10 and has a circumferential flange, or skirt, 16 depending an appreciable distance along the tank sidewall to form a watertight bell chamber which acts in the manner of a caisson to prevent water from rising within the cover, thereby assuring that ground water does not reach the gasket and cannot enter casing 10.

Casing 10 encloses a transformer core and coil assembly 24 including a laminated magnetic core 25 having a pair of winding legs 26 each of which is surrounded by an electrical coil 27. Magnetic core 25 is preferably constructed of a plurality of strips of magnetic ribbon of different width wound to a cruciform cross section. The coils 27 are preferably wound to circular cross section around the core legs 26, and each coil 27 may include concentric primary and secondary winding sections 28 and 29 respectively, separated by an annular insulating barrier 30. Upper and lower channel core clamps 32 and and 33 respectively enclose the upper and lower yokes of magnetic core 25, and blocks 36 of suitable insulating material such as maple wood are disposed between the coils 27 and the upper and lower channel core clamps 32 and 33 to prevent movement of the transformer windings under short circuit forces.

Flexible metallic banding straps 38 preferably of stainless steel connect the upper and lower channel core clamps and unite the core 25, the coils 27, and the upper and lower core clamps 32 and 33 as an integral assembly. The flexible straps 38 generally follow the periphery of core 25 and extend through the windows in the coils 27. The upper end of banding straps 38 are folded around and spot welded to transverse bars 39 which fit within bayonet slots 40 in the legs and adjacent the ends of upper channel core clamp 32 to affix the upper end of the straps 38 to upper core clamp 32. Elongated slots 41 provided at longitudinally spaced apart points in the web of lower core clamp 33 receive the flexible banding straps 38 which at their lower end are folded around and welded to tensioning members 42. The tensioning members 42 are disposed beneath the web of lower channel core clamp 33 and have clearance apertures for receiving threaded securing means such as a bolt 45 and nut 46 which may be tightened to draw the tensioning members 42, and thus the lower ends of the flexible banding straps 38, together. As tension is applied to the banding straps 38, the upper and lower core clamps 32 and 33 are drawn against the core yokes and against the wooden blocks 36, thereby holding the core 25 and coils 27 in alignment and supporting the coils 27 between upper and lower core channels 32 and 33.

Figure 4:
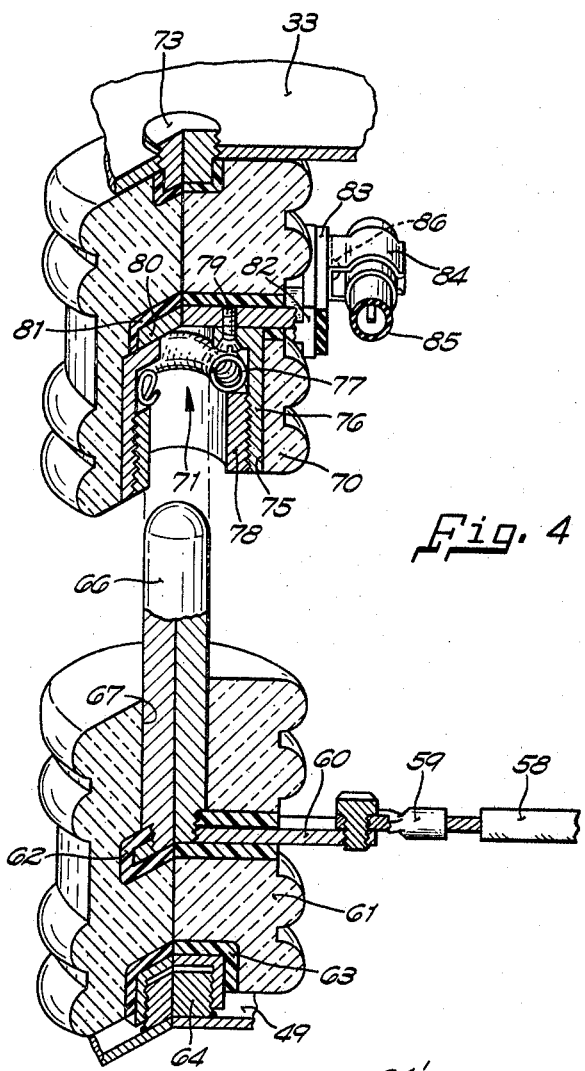
FIG. 4 is an enlarged view of the means for disconnecting the transformer winding from the underground cable.

The transformer core and coil assembly 24 is immersed in a suitable insulating dielectric fluid such as transformer oil 47 within casing 10. Elongated metallic cable entrance tubes 48 welded at diametrically opposed locations to the inner periphery of the sidewall of casing 10 extend through and are welded to the bottom wall 49 of casing 10. The metallic cable entrance tubes 48 are open at their upper end above the level of the oil 47 within casing 10 and serve as entrance conduits for the underground primary cable 52 and secondary cable 53 of the underground distribution system. Domestic loads may be supplied from the transformer over secondary cable 53. The primary cable 52 and secondary cable 53 having an exterior covering of insulation which insulates the cable conductors from the metallic tank 10 and obviates the necessity of insulating bushings for the transformer. Rubber plugs 55 surrounding the cables 52 and 53 may be secured by suitable means such as cement adjacent the upper open ends of the cable entrance tubes 48 to seal them against entry of water. A volume of air or insulating gas 56 within the casing 10 above the oil 47 further insures against entry of ground water into the casing 10 through the cable entrance tubes 48. The primary cable 52 may extend downwardly within tank 10 and include two insulated conductors 58 which spread apart and are crimped to connectors 59 which may be affixed by bolts to terminals 60 on insulating support bushings 61 secured to the bottom wall 49 of casing 10. The insulating support bushings 61 are spaced apart in a direction longitudinal of and beneath lower core clamp 33 and may have internally threaded metallic cup-shaped members 63 (See FIG. 4) affixed by suitable means such as cement adjacent their lower ends. The members 63 engage threaded metallic studs 64 welded to the bottom wall 49 of casing 10 to thereby secure bushings 61 to casing 10. Terminal 60 may extend into a radial opening 62 in bushing 61 and be secured therein by suitable means such as cement. A vertically extending metallic bayonet stationary contact rod 66 may protrude through an axial bore 67 in the upper portion of bushing 61 and have external threads at its lower end engaged with a threaded hole in terminal 60.

Insulating bushings 70 affixed to lower core clamp 33 above the support bushings 61 carry female movable contacts 71 (see FIG. 4) adapted to releasably mate with and slidably receive the bayonet contacts 66 on bushings 61 upon lowering movement of core and coil assembly 24 into casing 10. The insulating bushings 70 may have studs 73 affixed by suitable means such as cement which engage threaded holes in the web of lower core channel 33. Bushings 70 may also have axial compartments 75 at their lower end which receive internally threaded metallic cup-shaped terminal casings 76. A helical current transfer spring 77 is retained within cup-shaped casing 76 by a threaded bushing 78. Spring 77 wraps around and bears against contact rod 66 in the manner of a closely surrounding toroid, and its outer diameter bears against and is in current interchange relation with the interior periphery of a cup-shaped casing 76. Cup-shaped casing 76 may be secured by screws 79 to a metallic terminal member 80 which is received within a radial aperture 81 intermediate the ends of bushing 70 and is secured therein by suitable means such as cement. At its radially outer end terminal member 80 has a transverse portion 82 to which an elongated insulating support plate 83 is secured carrying spring clips 84 spaced apart longitudinally thereof and adapted to releasably support a fuse 85 for protecting the transformer primary winding 28. Mounting screws 86 for one spring clip 84 electrically connect it to terminal member 80 and to metallic terminal casing 76 and also support insulating plate 83 on transverse portion 82 of terminal member 80. The other spring clip 84 may be secured to support plate 83 by a rivet (not shown) and carry a terminal 88 (shown on FIG. 2) to which a primary lead 89 from the transformer primary winding 28 is electrically connected. It will thus be appreciated that the stationary bayonet contact rods 66 on support bushings 61 and the releasably mating female contacts 71, including current transfer springs 77 carried on bushings 70, provide means for disconnecting primary transformer windings 28 from the underground primary cable 52.

The leads 90 from the transformer secondary windings 29 may be crimped to spade type metallic terminals 91 and suitable terminals 92 are swaged to the relatively flexible central conductors 95 of the secondary cable 53. Leads 90 and conductors 95 are releasably connected together through terminals 91 and 92 by means of bolts 94. It will also be appreciated that, if desired, mating movable and stationary contacts may be provided on the casing and the core and coil assembly, respectively, to provide disconnection between the secondary winding and the secondary cable in a manner similar to that disclosed for the primary side.

In accordance with the invention, the transformer core and coil assembly 24 may be easily and quickly removed from service for inspection and repair, for changing the fuses 85 and for changing out the transformer by substituting a unit of the same or different kva. rating. Further, in accordance with the invention, the transformer may be easily de-energized by means accessible from above the ground. The integral transformer core and coil assembly 24 is preferably suspended from cover 11 by means permitting vertical movement of the core and coil assembly 24 within casing 10 relative to cover 11 to disconnect the bayonet contact plugs 66 from the female contacts 71. As illustrated in the drawing, a threaded rod 96 welded to the web of upper core channel 32 extends through a clearance aperture 97 in cover 11 and is engaged by an eyenut 98 above cover 11. It will be appreciated that turning eyenut 98 will lift core and coil assembly 24 relative to cover 11 and withdraw movable female contacts 71 from the bayonet stationary rod contacts 66 to disconnect the transformer primary winding 28 from the primary cable 52. It will also be appreciated that eyenut 98 permits lifting the core and coil assembly 24 out of casing 10 for service or repair. Further, since the insulating bushings 70 carry the fuse clip 84, the fuses 85 are readily accessible for replacement.

The open end of an annular metallic member 100 welded to cover 11 in surrounding relation to eyenut 98 is closed by a detachable cover plate 101. A metallic ring 102 welded adjacent the upper end of annular member 100 is provided with a circumferential groove in which an annular gasket 103 of suitable resilient material such as rubber is compressed by cover plate 101 to provide a watertight seal. Cover plate 101 may be secured by bolts 104 extending through clearance apertures in cover plate 101 and engaged within circumferentially spaced apart tapped holes in ring 102.

Lower channel core frame 33 extends beyond the coils 27 and has T-shaped slots 106 (see FIG. 3) formed in the web adjacent the ends thereof which receive T-shaped guide rails 107 welded to the inner periphery of the casing 10, and the slots 106 cooperate with the guide rails 107 to properly align the core and coil assembly 24 while it is being raised and lowered into casing 10 and insure that the bayonet rod stationary contacts 66 are aligned with the female movable contacts 71 carried by the core and coil assembly 24.

Figure 5:
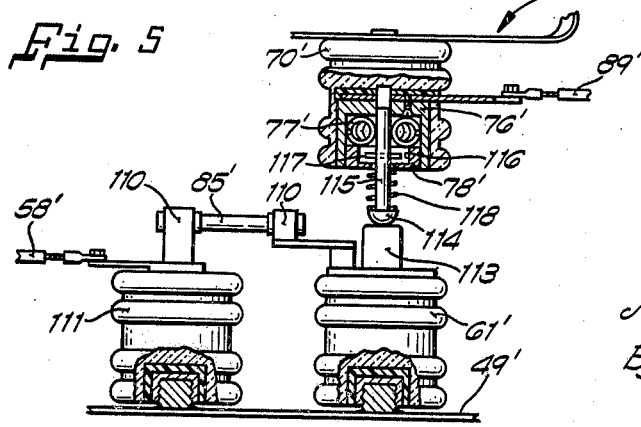
FIG. 5 is a partial vertical sectional view through an alternative embodiment of the invention.

In an alternative embodiment of the invention illustrated in FIG. 5, similar elements are referred to by the same reference numerals with the addition of the prime (') designation. In this embodiment, the fuses 85' are not mounted on the core and coil assembly 24' but rather are supported on spring clips 110, one of which is on insulating bushing 61' and the other of which is on an insulating bushing 111 affixed to casing bottom wall 49' in spaced relation to insulating bushing 61'. The conductors 58' from primary cable 52' are electrically connected to the spring clips 110 on bushings 111, and the spring clips 110 on bushings 61' are electrically connected to planar butt contacts 113 on the upper surface of insulating bushing 61'. A hemispherical metallic contact 114 on a metallic movable contact rod 115 carried by insulating bushing 70' normally butts against planar contact 113 and is electrically connected through helical current transfer spring 77' to the leads 89' from the primary windings 28'. Contact rod 115 slidably extends through an axial bore in externally threaded bushing 78' which engages the internal threads on cup-shaped casing 76' and has a radially extending slot 116 in which a pin 117 extending through rod 115 slidably reciprocates to limit downward movement of contact rod 115. A compression spring 118 circumjacent contact rod 115 and compressed between bushing 78" and the hemispherical contact 114 normally provides high pressure butt engagement between contacts 113 and 114. It will be appreciated that because of spring 118 of this embodiment only very small displacement of the core and coil assembly 24' is required to result in high pressure engagement between contacts 113 and 114 when the transformer is energized by lowering core and coil assembly 24' within casing 10' and that, consequently, the core and coil assembly 24' need only be raised a small distance by eyenut 98' to separate contacts 113 and 114 and de-energize the transformer windings.

While only a few embodiments of the invention have been illustrated and described, many modifications and variations thereof will be readily apparent to those skilled in the art, and consequently it is intended in the appended claims to cover all such modifications and variations which fall within the true spirit and scope of the invention.

I claim:

1. An electrical distribution transformer construction comprising, in combination, a hollow casing open at its upper end and including a cover closing said open upper end in watertight relationship thereto, said casing having at least one vertical sidewall, dielectric liquid within said casing, a transformer core and coil assembly immersed in said liquid, said transformer core and coil assembly being movable relative to said casing, moving means having an end within said casing attached to said core and coil assembly, an end exterior of said casing and being operable exterior said casing for moving said core and coil assembly within said casing, electrical conductor means extending into said casing, first contact means mounted within said casing on a wall thereof and in an insulated relationship therewith, said first contact means being connected to said conductor means, second contact means mounted on said core and coil assembly in an insulated relationship therewith and being electrically connected to said transformer coil, said first and second contact means having an engaged position and a disengaged position and being movable to and from said positions upon movement of said core and coil assembly within said casing whereby said transformer coil and said cable are electrically connected and disconnected.

2. The combination according to claim 1 wherein said moving means is supported by said cover and holds said core and coil assembly in a suspended relationship with the cover.

3. The combination according to claim 2 wherein said core and coil assembly and said moving means are movable vertically relative to said casing so that said core and coil assembly is moved vertically by movement of said moving means, said first and second contact means being vertically aligned whereby said first and second contact means are engaged and disengaged by vertical movement of said core and coil assembly.

4. An underground electrical distribution system comprising a hollow cylindrical casing buried in the earth and having a continuous vertical sidewall open at its upper end, a cover closing said open upper end, means for releasably securing said cover to said casing, dielectric liquid within said casing, a transformer core and winding assembly suspended from said cover and immersed in said liquid whereby said core and winding assembly may be lowered into and raised out of said casing upon vertical movement of said cover, first insulator means affixed to the interior periphery of said casing, stationary contact means mounted on said first insulator, second insulator means affixed to said core and winding assembly, movable contact means mounted on said second insulator and electrically connected to said winding, said movable contact means being movable into and out of engagement with said stationary contact means upon the respective lowering and raising movement of said core and winding assembly, an electrical conductor connected to said stationary contact means, and means for mounting a fuse having a pair of spaced apart fuse holding terminals respectively electrically connected between said conductor and said winding, said fuse mounting means being supported by said core and winding assembly whereby removal of said core and winding assembly also removes said fuse mounting means.

5. The combination according to claim 4 further comprising moving means mounted on said cover and having a member exterior of said casing, said moving means being attached to said core and winding assembly for moving said core and winding assembly vertically relative to said cover and casing whereby said stationary and movable contact means are engaged and disengaged.

6. The combination according to claim 5 wherein said means for mounting a fuse is supported on said second insulator means.

References Cited

UNITED STATES PATENTS

| 2,100,721 | 11/1937 | Parsons | 174—37 X |
| 2,220,615 | 11/1940 | Pittman et al. | 336—94 X |
| 2,774,807 | 12/1956 | Whitman | 174—17.11 |
| 2,777,009 | 1/1957 | Whitman | 174—17.11 |
| 3,164,794 | 1/1965 | Broverman et al. | 336—94 X |

FOREIGN PATENTS 47,366   1888   Germany.

ROBERT K. SCHAEFER, Primary Examiner

H. J. HOHAUSER, Assistant Examiner

U.S. Cl. X.R.

174—37; 336—94